March 8, 1960 J. R. STOVALL, JR 2,927,974

MAGNETIC TRANSDUCER

Original Filed Jan. 9, 1952 6 Sheets-Sheet 1

*INVENTOR.*

John R. Stovall Jr.

*BY*

George V. Eltgroth

ATTORNEY

March 8, 1960 J. R. STOVALL, JR 2,927,974

MAGNETIC TRANSDUCER

Original Filed Jan. 9, 1952 6 Sheets-Sheet 2

INVENTOR.
John R. Stovall Jr.
BY
George V. Eltgroth
ATTORNEY

March 8, 1960 J. R. STOVALL, JR 2,927,974

MAGNETIC TRANSDUCER

Original Filed Jan. 9, 1952 6 Sheets-Sheet 3

INVENTOR.
John R. Stovall, Jr.

BY

George V. Eltgroth

ATTORNEY

March 8, 1960 J. R. STOVALL, JR 2,927,974

MAGNETIC TRANSDUCER

Original Filed Jan. 9, 1952 6 Sheets-Sheet 4

INVENTOR.
John R. Stovall, Jr.

BY George V. Eltgroth

ATTORNEY

INVENTOR.
John R. Stovall, Jr.
BY
ATTORNEY

March 8, 1960 J. R. STOVALL, JR 2,927,974

MAGNETIC TRANSDUCER

Original Filed Jan. 9, 1952 6 Sheets-Sheet 6

*INVENTOR.*
John R. Stovall, Jr.

*BY*

George Vettgroth
ATTORNEY

United States Patent Office 2,927,974

Patented Mar. 8, 1960

2,927,974

MAGNETIC TRANSDUCER

John R. Stovall, Jr., Philadelphia, Pa., assignor to Sperry Rand Corporation, New York, N.Y., a corporation of Delaware Continuation of application Serial No. 265,702, January 9, 1952. This application August 29, 1956, Serial No. 608,417

4 Claims. (Cl. 179—100.2)

This invention relates generally to multiple-channel recording-reproducing magnetic sensing assemblies, and more particularly to apparatus of this nature characterized by improved freedom from functional interference between respective individual channels, and this application is a continuation of my application Serial Number 265,702, filed on January 9, 1952.

The invention is particularly useful in multiple-channel recording apparatus of the type in which signals are recorded simultaneously in a plurality of channels on a magnetic member from which the same signals are to be reproduced. For example, in electrical typewriter systems, electrical computer systems and the like, magnetic tapes are used for storing coded information in the form of pulses represented as a series of minute magnetized spots distributed in a plurality of parallel longitudinally disposed channels, selectively arranged so that a particular combination of pulses existing in corresponding positions in various channels may represent numbers, letters, punctuation, machine instruction or other information. In some cases, the electromagnetic translating devices in the heads of the recording apparatus may be staggered or offset from each other, generally, transversely of the tape.

It has been found that magnetic heads commonly employed in practice present certain difficulties in the operation of multiple-channel recording apparatus, particularly in the apparatus of systems referred to above. These difficulties are attributed to the fact that the customary interposition of sheets of para-magnetic substance, as for example, soft iron between adjacent magnetic circuits provides the full shielding effect, as intended, only when and while signals, previously recorded on the magnetic tape, are reproduced for "reading" purposes. This shielding effect is diminished, however, during the preceding "writing" operation when and while the apparatus is used to record these signals on the tape. Then it may happen that the shield may concentrate leakage flux to the density required for "writing," thereby producing spurious "writing," or information on the tape.

Up to the present it has not been possible to eliminate such spurious "writing" through any attempts to improve the shielding effect by changing the measurements, the shape or the substance of the shield in accordance with the generally known and accepted principles and practices which were supposed to furnish sufficient protection against any functional interferences between individual circuits.

It is, therefore, a primay object of this invention to provide a novel and improved recording-reproducing magnetic sensing assembly.

Another object is to provide a novel and improved magnetic head unit for recording or reproducing signals on and from a magnetic member.

A further object is to provide a novel and improved magnetic head unit of the type adapted to record and reproduce signals in a plurality of channels.

Another object of the invention is to provide a novel and improved magnetic head for recording and/or reproducing pulse-like signals in a plurality of channels.

A more specific object of the invention is to provide means for recording and reproducing information to or from a number of very closely arranged channels on and from a magnetic member as, for example, a tape, without cross-talk or spurious writing during recording or reproduction.

A specific object of the invention is to reduce cross-talk or spurious writing during recording to the same extent as it is minimized during reproduction.

Other objects and advantages of this invention will become apparent from the following description and the accompanying drawings.

In accordance with the present invention, the magnetic shields are displaced from the common surface of the magnetic head unit so that the magnetic flux concentrated at the surface of the shields will not produce spurious "writing," but without substantially impairing at the same time the shielding effect needed during the "reading" of the tape. It is suitable for that double purpose to recess the surface of the magnetic shields below the common surface of the magnetic head unit to the extent that the recess amounts to between and including one percent and tweny-five percent of the space between adjacnt recording channels. In the average case of a typical design such a recess will most likely equal 0.001 to 0.015 inch.

In the accompanying drawings the invention is exemplified in connection with a cylindrical contact magnetic head wherein the electromagnetic translating devices are staggered. The present invention is equally applicable, however, to magnetic head units on which the translating devices are not staggered, or where the contact surface is not cylindrical, but flat.

Figure 1 is a perspective view of a multiple-channel magnetic head unit in accordance with the present invention;

Figure 2 is an exploded perspective view both of side block 19 and center block 18 as separated parts of the multiple-channel head unit 15;

Figure 1:
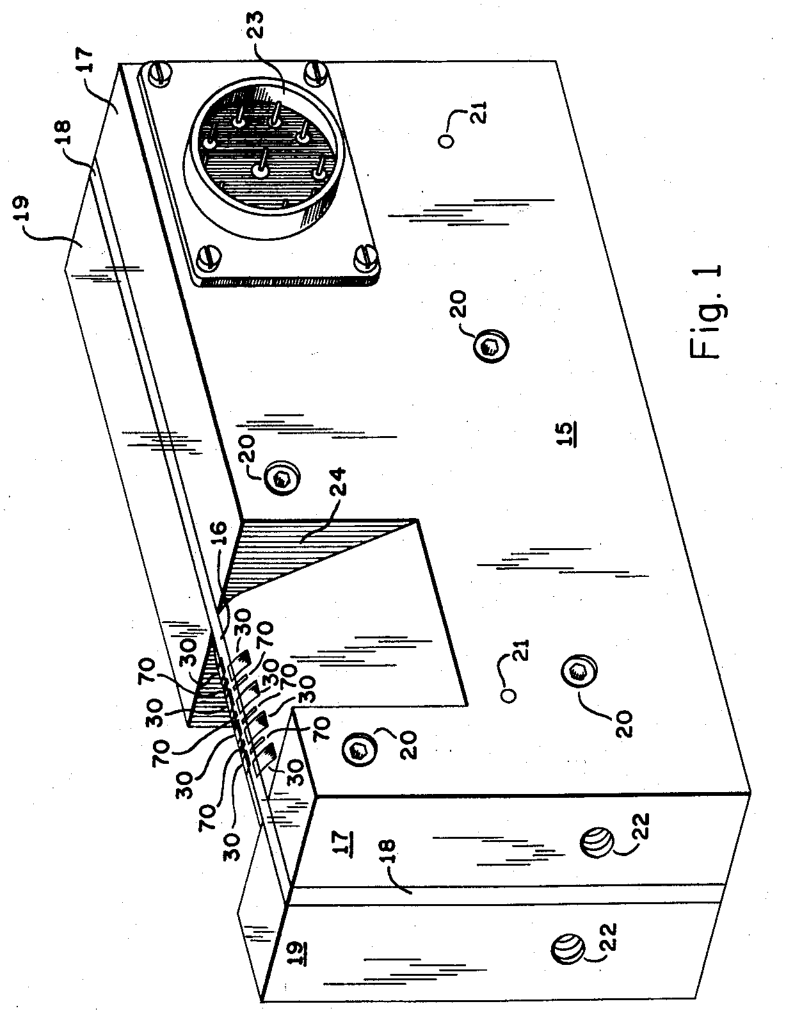
Figure 5:
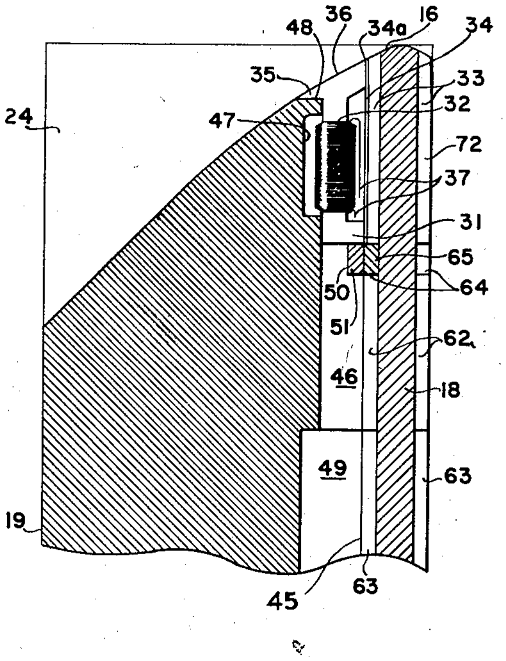
Figure 4:
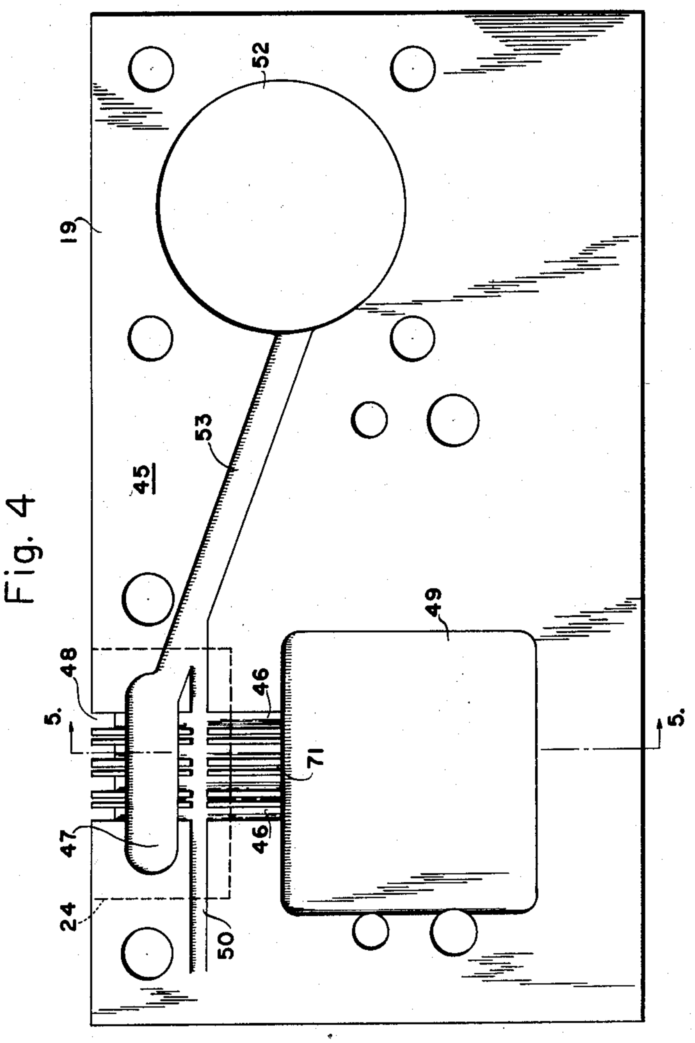
Figure 4 is a side elevational view of the left side block 19 in Figure 1 as though viewed from the center block 18.
Figure 7:
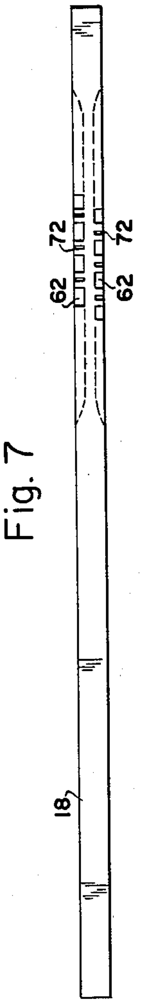
Figure 6:
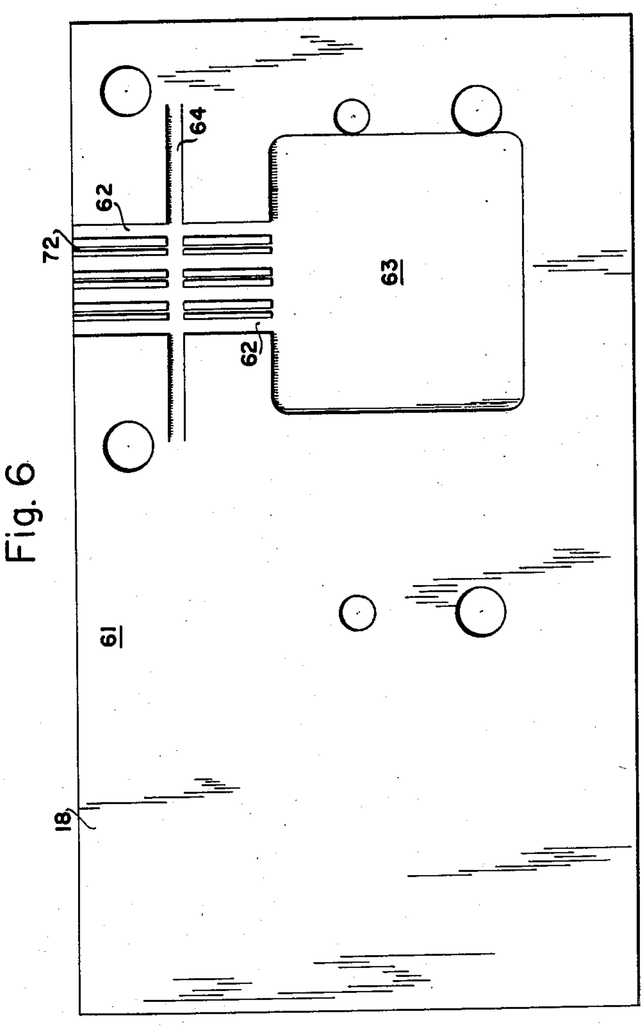

Figure 5 is an enlarged fragmentary sectional view of side block 19 along the lines 5—5 in Figure 4 and of the adjacent part of center block 18, showing one of the electromagnetic translating devices 30 in position;

Figure 6 is a side elevational view of center block 18 in Figure 1 as though viewed from the left side block 19 in Figure 4;

Figure 7 is a top plan view of center block 18 in Figure 1; and

Figure 8:
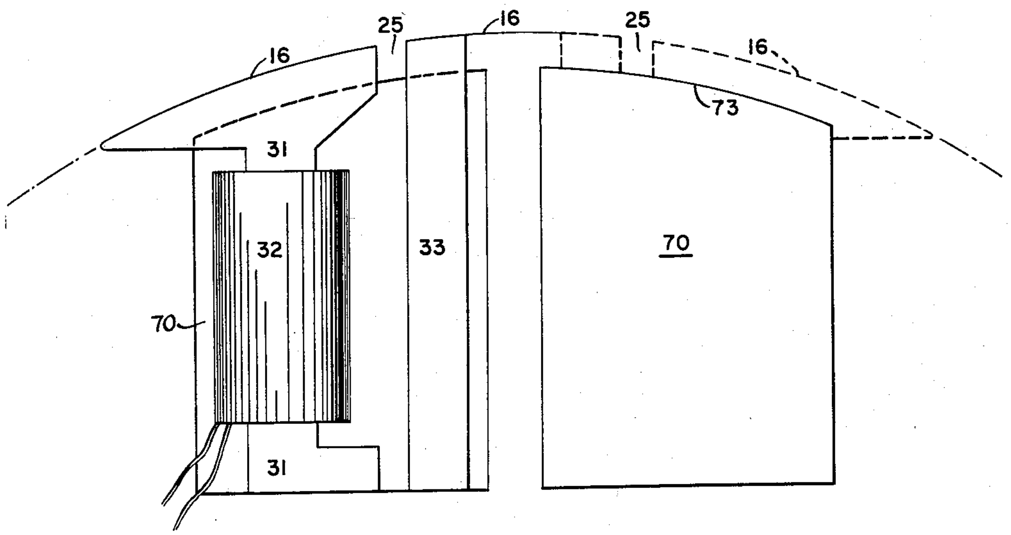

Figure 8 is an enlarged fragmentary sectional view along the lines 5—5 in Figure 4 extending through left side block 19, center block 18 and right side block 17, showing one of the electromagnetic translating devices 30 of the left side group and one magnetic shield 70 of the right side group in position.

In the drawings there is illustrated, by way of example, an eight-channel magnetic head unit 15 adapted for use with ribbon-like magnetic tapes and having a cylindrical surface 16 for the active tape contacting portion of the head. As shown in Figure 1, head unit 15 comprises two side blocks 17 and 19 and a narrow center block 18, of nonmagnetic material, such as "K Monel" metal, accurately ground and machined for assembly by screws 20 and aligning pins 21. Tapped holes 22 may be provided for mounting the head unit. The adjacent faces of these blocks are ground flat so as to insure close dimensional tolerances and, as described more fully hereafter, are provided with slots and recesses for supporting the eight electromagnetic translating devices indicated generally in Figure 1 by reference numeral 30.

The construction of devices 30 will be described in detail with reference to Figure 3. In order to facilitate the necessary spacing for the translating devices consistent with recording or reproducing, simultaneously, signals in eight channels on a narrow magnetic tape, they are arranged in two groups of four each, one group being supported in the adjacent faces of blocks 17 and 18, and the other group being mounted in the adjacent faces of blocks 18 and 19.

For making external connections to the translating devices, terminal connectors, such as receptacle 23, are mounted on the outer surfaces of blocks 17 and 19. The tape reading region 16 may be shaped as a sector of a cylinder by accurately grinding, before assembly, the top surfaces of the portions of the blocks 17, 18 and 19 in which the devices 30 are mounted. The notched portion 24 formed in the side blocks by this operation provides clearance for the tape. A better understanding of the manner in which blocks 17, 18 and 19 are machined may be obtained by first describing the construction of translating devices 30.

Figure 3:
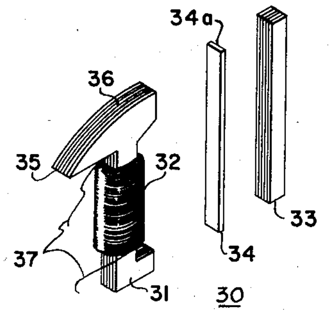
Figure 3 is an exploded view illustrating the construction of the electromagnetic translating devices embodied in the head unit 15 of Figure 1.

Referring to Figure 3, each device 30 comprises a first laminated core structure 31 upon which is wound the signal coil 32, a second laminated core structure 33 for completing the magnetic circuit through core 31, and a nonmagnetic shim 34 for interrupting the continuity of cores 31 and 33. Shim 34, which may be aluminum or brass sheeting from 0.0001 to 0.001 inch in thickness, defines the gap area or active surface 34*a* of the translating device for producing magnetization of the tape or for reproducing signals therefrom. It is possible, however, to obtain the same effect by merely leaving an air gap 25 of approximately the same measurements as shim 34, as shown in Figure 8.

Precisely dimensioned laminations are used for the core structures. Core 31 is of generally U-shaped configuration but, as shown in the drawings, with one leg having an overhanging portion 35 of sufficient width to provide for an arcuate surface 36, conforming with the cylindrical surface 16. Since the entire winding of signal coil 32 is placed upon core 31, yoke 33 may be made up from a stack of straight laminations. As may be observed in Figure 1, when devices 30 are assembled in head unit 15, only the curved surface 36 of cores 31, the corresponding ends of cores 33 and the gap areas 34*a* provided by shims 34 are exposed. It may be observed also that the translating devices described herein permit the very close spacing of the gap areas 34*a* in adjacent channels.

Such close spacing would not be possible, however, without the interposition of thin sheets of paramagnetic substance as, for example, soft iron between adjacent translating devices 30 which serve as magnetic shields to minimize spurious writing and cross-talk between adjacent channels. The position of these shields is indicated by reference numeral 70. The thickness of the sheets, if not laminated, preferably will not amount to more than 0.009 inch. The top surface of these shields is recessed below the common surface of the magnetic head unit as will be described in connection with Figures 2 and 8.

The machining of side block 19 may be best understood by considering jointly Figures 4 and 5. It is believed obvious that these drawings are equally applicable to side block 17. The upper portion of face 45, adjacent to center block 18, is provided with four equally spaced milled slots 46, each of the proper depth to permit the insertion of a core 31 so that its pole faces are flush with face 45, a milled recess 47 being provided for receiving windings 32. Portions 48 of block 19 are cut out for receiving projections 35 of cores 31. The minimum distance between slots 46 is, of course, determined by the space required for winding 32. As an aid in milling slots 46 there is provided a substantially rectangular recess 49 having a depth equal to, or preferably, slightly greater than the depth required for the slots. This recess provides a free space region at the end (or start) of the milling operation and in addition serves as a guide for milling all of the slots to the same length and to a uniform depth throughout their length. Transverse to slots 46 there is provided a milled slot 50 for holding a brass strip 51 which serves as a rest or stop for cores 31. Slot 50 is accurately positioned so that the curved surfaces 36 of cores 31 lie in the cylindrical surface 16.

At the location for receptacle 23, a hole 52 is drilled for receiving the connecting leads 37 from each device 30 in the group to the receptacle terminals. A channel 53 connects the head region with the receptacle location. The manner in which the top surface of block 19 is ground is shown in the cross-sectional view of Figure 5.

Figure 2:
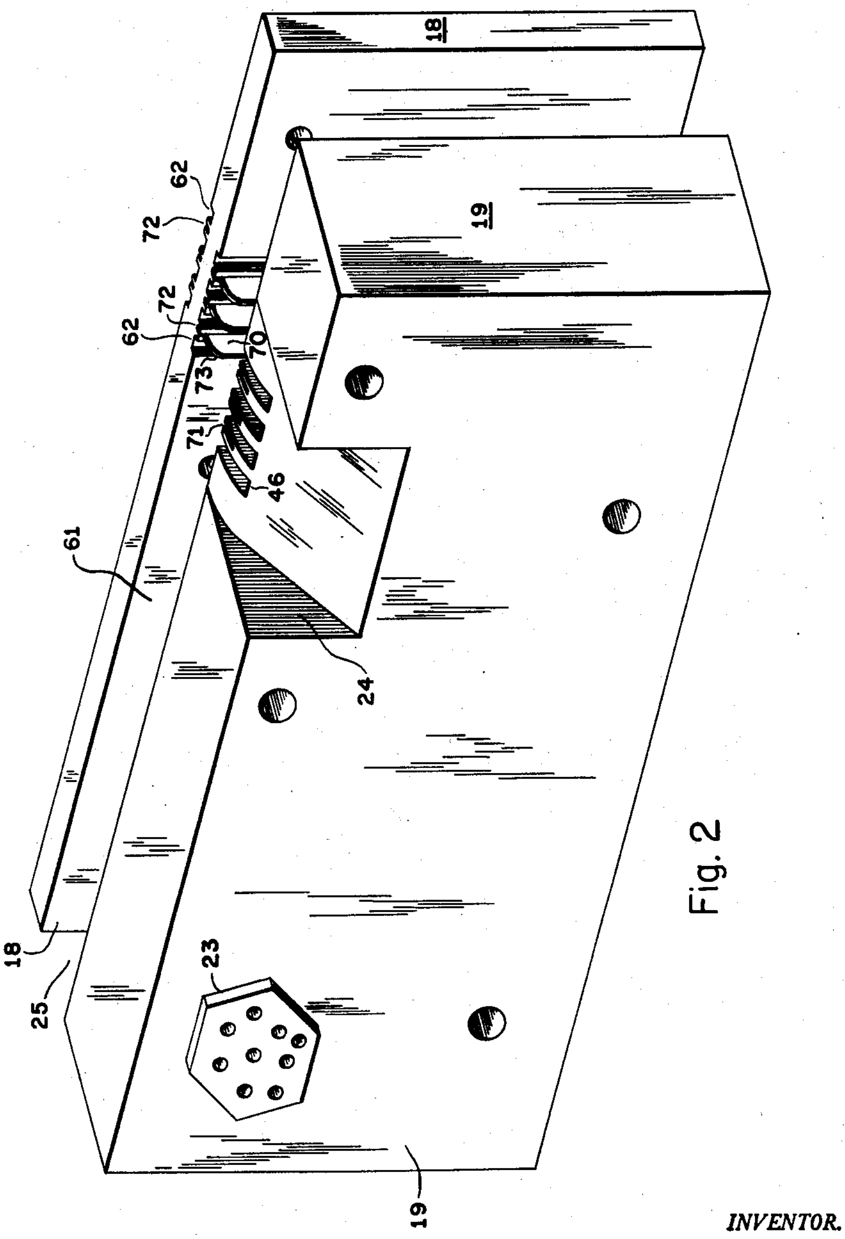

As may be observed in Figure 2 the faces of center block 18 support cores 33. Thus, as shown in Figure 6 and 7, the upper portion of face 61 adjacent to block 19 is provided with four milled slots 62 aligned with slots 46 and of a depth permitting yokes 33 to be inserted flush with face 61. A recess 63 may be provided for the purposes explained above with reference to recess 49. There is provided also an accurately milled slot 64 transverse to slots 62 for receiving the brass stop strip 65 for yokes 33 as shown in Figure 5.

The machining of the adjacent faces of blocks 17 and 18 which support cores 31 and yokes 33, respectively, is performed in a manner similar to that described above for the adjacent faces of blocks 18 and 19 because side blocks 17 and 19 and the two faces of center block 18, one of them adjacent to side block 17 and the other one adjacent to side block 19, are of identical construction, except in the case of staggered translating devices. In the latter case, the position of the devices 30 on one side of the head unit corresponds to the position of the magnetic shields 70 on the other side of the unit as indicated in Figure 1.

The magnetic shields 70 are inserted, after assembly, into sawed slots 71 and 72, respectively, which lie between slots 46 in side blocks 17 and 19 and between the aligned slots 62 in the center block 18. Their top surfaces 73 are displaced, however, from the surface 16 of the active tape contacting portion of the magnetic head unit 15. This displacement is illustrated, by way of example, in Figure 8. The reference numerals shown there are identical with those used on Figures 1, 3, 4, 5, 6, and 7, except for the numerals 25 and 73. Numeral 25 refers to the air gap formed between the side blocks and the center block which establishes the active surface of the translating devices 30. This active surface of the translating surface is similar to that shown in Figure 5 and labeled 34*a*. Numeral 73 indicates the top surface of the magnetic shields 70 so that the recessing of the top surface of the shield below the tape contacting portion 16 of the head unit 15 is illustrated by the distance between 73 and 16.

As previously mentioned, in the operation of recording apparatus employing magnetic head units provided by this invention, the displacement of the top surface 73 of the magnetic shields 70 from the tape contacting portion 16 of the head unit 15 is effective to keep the shields from concentrating leakage flux to the density required for "writing" and minimizes, therefore, spurious "writing." This may be accomplished, for example, by recessing top surface 73 of the magnetic shields below the tape contacting portion 16 of the head unit to the extent that the distance between 73 and 16 amounts to between and including one percent and twenty-five percent of the space between adjacent recording channels which, in most cases, will equal 0.001 to 0.015 inch. The effect of minimizing cross-talk and spurious writing may be enhanced by rounding all magnetic edges lying in the neighborhood of the recording channels with the exception of those directly facing the air gap.

While this invention has been described and illustrated with reference to a specific embodiment, it is to be understood that the invention is capable of various modifications and applications, not departing essentially from the spirit thereof, which will become apparent to those skilled in the art. For example, each group of translating devices 30 may be arranged in such a way that their respective active gap areas are not offset from each other.

What is claimed is:

1. A magnetic head unit comprising, a cylindrical magnetic surface for contacting magnetic tapes, two side blocks, a center block, said contacting surface including surfaces of said blocks, said blocks being fabricated of non-magnetic material, a plurality of electromagnetic translating devices, said blocks being provided with a plurality of first slot means for receiving and supporting said electromagnetic translating devices to be flush with said contacting surface, said first slot means in said center block being disposed in staggered fashion on opposite sides of said center block along said contacting surface and extending therethrough and mating respectively with said first slot means in said side block, a plurality of second slot means in said blocks spaced axially along and extending through said contacting surface, said second slot means being disposed in staggered fashion and intermediate said first slot means with said second slot means in said center block mating respectively with said first slot means in said side block, and a plurality of shields of magnetic material respectively placed in said second slot means to inhibit magnetic intercommunication between adjacent translating devices, one end of each of said shields being adjacent to the contacting surface of said central block and being spaced therefrom so that said ends of said shields do not concentrate a substantial amount of flux at said contacting surface.

2. A magnetic head unit comprising, a cylindrical magnetic surface for contacting magnetic tapes, two side blocks, a center block, said center block and said side blocks being joined at mating surfaces to form said contacting surface along outer surfaces thereof, said blocks being fabricated of non-magnetic material, said center block and side blocks being provided with a plurality of mating first slots formed along the inner mating surfaces of said blocks and through said contacting surface for receiving and supporting said electromagnetic translating devices along the full length thereof and to be flush at one end thereof with said contacting surface, said first slots being disposed in staggered fashion on said contacting surface, a plurality of second mating slots formed in said contacting surface and along the inner mating surfaces of said blocks and also disposed in staggered fashion and between said first slots, and a plurality of shields of magnetic material placed in said second slots and extending along substantially the full length of said translating devices to inhibit magnetic intercommunication between adjacent translating devices, said shield being recessed substantially below the contacting surface of said central block to prevent spurious signals from said shield being produced on said magnetic tape.

3. The magnetic head unit recited in claim 2 wherein each of said translating devices comprises a first laminated magnetic core structure positioned and supported in one of said first slots of one of said end blocks, a signal coil wound around said first core, a second laminated magnetic core structure positioned and supported in the mating one of said first slots in said center block for completing the magnetic circuit through said first core, and a non-magnetic shim positioned between said first and second magnetic core structures for interrupting the continuity of the magnetic circuit including said first and second core structures, at least one end of each of said first and second structures and said shim means being in flush mounted relationship with said cylindrical contacting surface whereby said shim defines the gap spacing of said translating device.

4. The magnetic head unit described in claim 1, wherein each of said shields comprises a sheet of magnetic material disposed with one end thereof below said contacting surface, each of said shields being positioned in mating ones of said second slots in said center block and one of said blocks, each of said shields shielding most of the area of said core structures of adjacent translating devices.

References Cited in the file of this patent

UNITED STATES PATENTS

| | | |
|---|---|---|
| 2,144,844 | Hickman | Jan. 24, 1939 |
| 2,561,338 | Camras | July 24, 1951 |
| 2,618,709 | Eckert | Nov. 18, 1952 |
| 2,706,752 | Dupy | Apr. 19, 1955 |

UNITED STATES PATENT OFFICE

CERTIFICATE OF CORRECTION

Patent No. 2,927,974 March 8, 1960

John R. Stovall, Jr.

It is hereby certified that error appears in the printed specification of the above numbered patent requiring correction and that the said Letters Patent should read as corrected below.

Column 6, line 38, for "said blocks" read -- said end blocks --.

Signed and sealed this 27th day of September 1960.

(SEAL)
Attest:

KARL H. AXLINE
Attesting Officer

ROBERT C. WATSON
Commissioner of Patents